United States Patent
Park et al.

(10) Patent No.: US 9,241,319 B2
(45) Date of Patent: Jan. 19, 2016

(54) METHOD AND APPARATUS FOR PROCESSING PACKET IN MULTI-CHANNEL WIRELESS NETWORK

(71) Applicant: ELECTRONICS AND TELECOMMUNICATIONS RESEARCH INSTITUTE, Daejeon (KR)

(72) Inventors: Tae Joon Park, Daejeon (KR); Chang Sub Shin, Daejeon (KR); Wun-Cheol Jeong, Daejeon (KR); Hoyong Kang, Daejeon (KR); In Hwan Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 155 days.

(21) Appl. No.: 14/065,459

(22) Filed: Oct. 29, 2013

(65) Prior Publication Data
US 2015/0036675 A1 Feb. 5, 2015

(30) Foreign Application Priority Data
Jul. 31, 2013 (KR) .................. 10-2013-0091108

(51) Int. Cl.
*H04W 56/00* (2009.01)

(52) U.S. Cl.
CPC .................................. *H04W 56/001* (2013.01)

(58) Field of Classification Search
None
See application file for complete search history.

(56) References Cited

U.S. PATENT DOCUMENTS

| 6,836,469 B1* | 12/2004 | Wu ............................... 370/322 |
| 2007/0133813 A1* | 6/2007 | Morishima ........................ 381/59 |
| 2013/0016739 A1* | 1/2013 | Penisoara et al. ............. 370/512 |

* cited by examiner

*Primary Examiner* — Chi H Pham
*Assistant Examiner* — Shick Hom
(74) *Attorney, Agent, or Firm* — NSIP Law

(57) ABSTRACT

A multi-channel wireless network acquires reference time information that is commonly applied to all multi-channels and acquires packet receiving time information of a received packet on each channel basis based on the reference time information by spreading and applying the reference time information to each channel.

12 Claims, 5 Drawing Sheets

METHOD AND APPARATUS FOR PROCESSING PACKET IN MULTI-CHANNEL WIRELESS NETWORK

CROSS-REFERENCE TO RELATED APPLICATION

This application claims priority to and the benefit of Korean Patent Application No. 10-2013-0091108 filed in the Korean Intellectual Property Office on Jul. 31, 2013, the entire contents of which are incorporated herein by reference.

BACKGROUND OF THE INVENTION (a) Field of the Invention

The present invention relates to a method and apparatus for processing a packet in a multi-channel wireless network.

(b) Description of the Related Art

In general, a packet that is forwarded through an existing wireless network is communicated through a predetermined channel, and in most cases, a packet is transmitted/received using only one channel or a packet is independently analyzed in each channel.

However, there is now a case of allocating and using a plurality of physical channels to one logical channel like a channel jump media access method. In this case, because a channel is allocated based on time division characteristics, a relative time difference between channels is important. However, when an existing apparatus simultaneously transmits/receives a packet using at least one channel, it is difficult to adjust a corresponding time reference on a channel basis. Further, when analyzing a packet, a relative time difference of each packet cannot be analyzed or only time difference analysis of limited accuracy is available.

SUMMARY OF THE INVENTION

The present invention has been made in an effort to provide a method and apparatus for processing a packet having advantages of transmitting and receiving the packet that is synchronized with each channel in a wireless communication system that transmits/receives the packet through at least two multi-channels.

An exemplary embodiment of the present invention provides a packet processing apparatus in a multi-channel wireless network including: a plurality of transceivers that each receive or transmit a packet on each channel basis; a reference clock management unit that provides reference time information that is commonly applied to all multi-channels and that measures a packet receiving time based on the reference time information, when a packet is received by one transceiver; and a controller that acquires a packet receiving time on each channel basis that is measured based on the reference time information from the reference clock management unit.

The reference clock management unit may be connected to the plurality of transceivers, measure a packet receiving time at which a corresponding transceiver receives a packet based on the reference time information according to an interruption signal that is provided from one transceiver, and notify the controller that the transceiver has received a packet. The controller may acquire the packet receiving time and channel information of a transceiver having received a packet from the reference clock management unit according to notification of the reference clock management unit, and may receive a packet from a corresponding transceiver based on the channel information.

The transceiver may generate the interruption signal at a time point at which a preamble of the received packet is terminated, and may provide the interruption signal to the reference clock management unit.

Another embodiment of the present invention provides a packet processing apparatus in a multi-channel wireless network, the packet processing apparatus including: a plurality of transceivers that each receive or transmit a packet on each channel basis; a plurality of clock synchronization units that simultaneously generate and output a synchronization signal for the plurality of transceivers and that enable the plurality of transceivers to acquire reference time information; and a controller that acquires a measured packet receiving time and a received packet based on the reference time information that is acquired based on the synchronization signal from the plurality of transceivers.

The clock synchronization units may output the synchronization signal to a corresponding transceiver by operating according to broadcast writing that is provided to the controller.

The plurality of transceivers may include a clock generator, and the plurality of transceivers record time information based on a clock signal that is simultaneously output from a clock generator according to a synchronization signal, and the time information may be used as reference time information.

The transceivers may measure a packet receiving time at which a packet is received based on the recorded time information, and may provide the packet receiving time to the controller.

The clock synchronization unit may include a first operator that activates the synchronization signal and that outputs the synchronization signal to a corresponding transceiver, when one of the broadcast writing and a chip selection signal is activated.

Yet another embodiment of the present invention provides a method of processing a packet in a multi-channel wireless network, the method including: acquiring reference time information that is commonly applied to all multi-channels; acquiring packet receiving time information of a packet that is received on each channel basis based on the reference time information; and acquiring and analyzing a relative time difference between the received packets on each channel basis based on a packet receiving time of the received packet.

The acquiring of reference time information may include acquiring reference time information from a reference clock management unit that is connected to all channels, and wherein the acquiring of packet receiving time information may include measuring a packet receiving time of a corresponding channel based on reference time information that is provided from the reference clock management unit.

The acquiring of packet receiving time information may include generating an interruption signal, when a packet is received through a physical layer in each channel, and measuring a packet receiving time on a channel basis based on reference time information that is commonly applied on an all channel basis that is provided from the reference clock management unit according to the interruption signal. The interruption signal may occur at a time point at which a preamble of the received packet is terminated.

The acquiring of reference time information may include enabling each transceiver to record time information at the same position by simultaneously operating transceivers corresponding to each channel and using the recorded time information as commonly recorded reference time information.

DETAILED DESCRIPTION OF THE EMBODIMENTS

Figure 1:
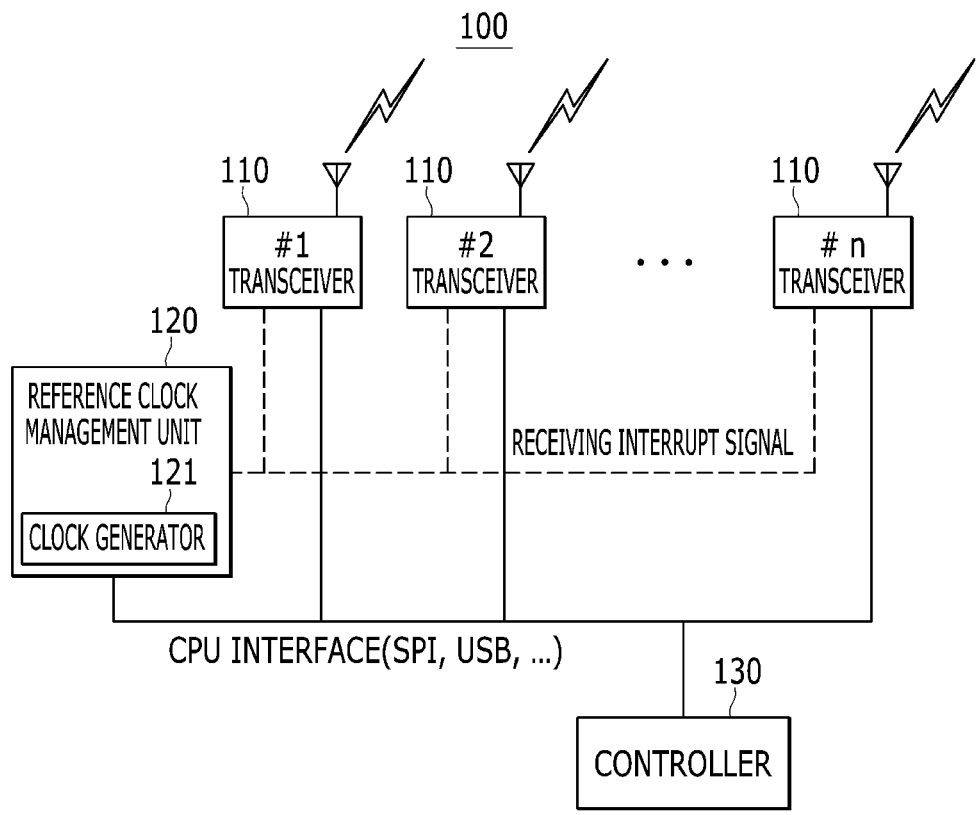
FIG. 1 is a diagram illustrating a structure of a packet processing apparatus in a multi-channel wireless network according to a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

In addition, in the entire specification and claims, unless explicitly described to the contrary, the word "comprise" and variations such as "comprises" or "comprising" will be understood to imply the inclusion of stated elements but not the exclusion of any other elements.

Hereinafter, a method and apparatus for processing a packet in a multi-channel wireless network according to an exemplary embodiment of the present invention will be described.

FIG. 1 is a diagram illustrating a structure of a packet processing apparatus in a multi-channel wireless network according to a first exemplary embodiment of the present invention.

A packet processing apparatus 100 according to a first exemplary embodiment of the present invention includes a plurality of transceivers 110 for transmitting/receiving a packet that is transmitted/received on a plurality of channel bases, a reference clock management unit 120, and a controller 130.

The packet processing apparatus 100 that is formed in such a structure is positioned within a region in which at least one wireless network service is provided, and receives and analyzes a packet within a receiving range.

The transceiver 110 receives and transmits a packet through a corresponding channel.

The reference clock management unit 120 measures a time at which an external input signal arrives. The reference clock management unit 120 acquires channel information of a transceiver in which an external input signal is received. For this purpose, the reference clock management unit 120 includes a clock generator 121, which is a clock. The clock generator 121 may be controlled by an external input so that the clock generator 121 itself may operate or may synchronize with another clock generator.

The reference clock management unit 120 records a time at which a packet is received using the clock generator 121, and notifies the controller 130 that a packet has been received. Specifically, when the transceiver 110 receives a packet, an interruption signal notifying that a packet has arrived in a physical layer in a specific condition occurs. When an interruption signal occurs, the reference clock management unit 120 records a time at which the packet is received and notifies the controller 130 that the packet has been received.

When the packet is received, the controller 130 determines channel information (e.g., a transceiver identification number) with which the packet has been received through the reference clock management unit 120 and packet receiving time information, and reads a packet that is received by the transceiver 110 corresponding to the received channel information. At least one controller 130 may exist.

In an exemplary embodiment of the present invention, by applying a clock of the same measure to all transceivers 110 through the reference clock management unit 120, time information of a packet that is received in the physical layer may be used. Therefore, relatively precise receiving time information may be provided.

The transceiver 110 generates an interruption signal notifying that a packet has arrived, and generates an interruption signal of a received packet regardless of a length of the received packet. For example, in order to transmit a packet using wireless communication, a constant preamble size is used and thus an arrival time point of a packet may be determined using a time point at which a preamble of a received packet is terminated. That is, at a time point at which a preamble of the received packet is terminated, the transceiver 110 may generate an interruption signal.

Figure 2:
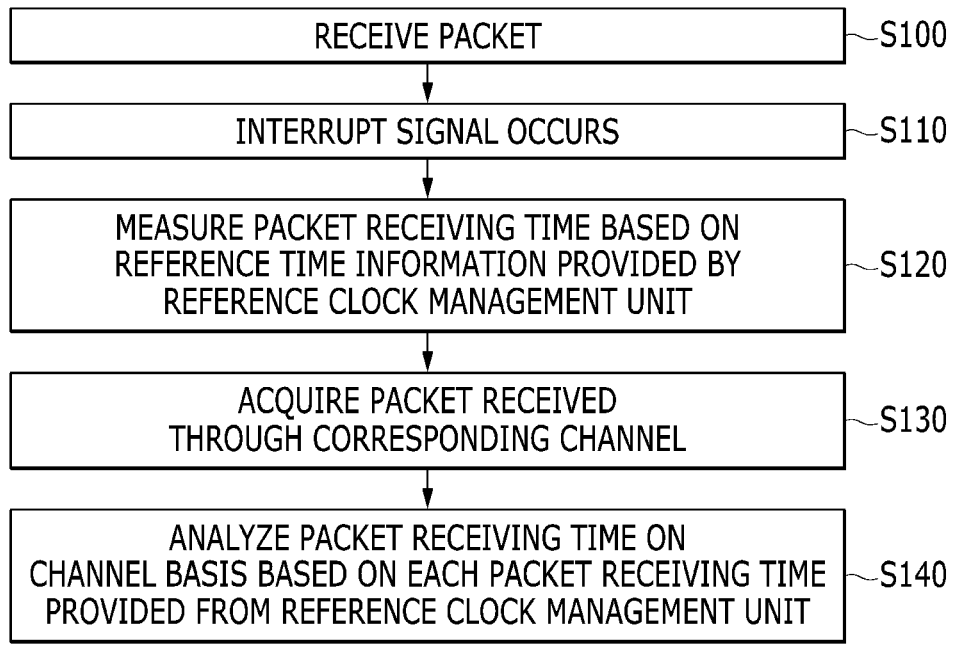
FIG. 2 is a flowchart illustrating a method of processing a packet according to a first exemplary embodiment of the present invention.

FIG. 2 is a flowchart illustrating a method of processing a packet according to a first exemplary embodiment of the present invention.

As shown in FIG. 2, when a packet is transmitted/received through a plurality of multi-channels, reference time information that is commonly applied to all multi-channels is acquired, and by applying such reference time information to each channel, a packet receiving time is measured.

Specifically, when a packet is received through a random channel (S100), while an interrupt signal occurs, a packet receiving time is acquired based on a reference time that is commonly applied to all channels (S110). That is, a packet receiving time is measured by the reference clock management unit 120 that provides a reference time (S120). Channel information in which the packet is received is acquired.

Thereafter, the controller 130 determines that a packet has been received according to notification from the reference clock management unit 120, and acquires a packet through a transceiver of a corresponding channel according to channel information and a packet receiving time that is provided from the reference clock management unit 120 (S130).

Through such a process, the controller 130 analyzes packet receiving times that are measured based on a reference time that is provided to all channels by the reference clock management unit 120, and analyzes a relative receiving time of a packet that is received on each channel basis (S140). That is, with reference to packets of each channel, the controller 130 may accurately know a relative receiving time difference between packets.

In the above method of processing a packet, the controller 130 acquires a packet receiving time through the above process in a random channel, and when the packet is acquired, the controller 130 determines a corresponding channel as a reference receiving channel and diffuses and applies time information (packet receiving time) of a determined reference receiving channel to another channel. For example, when the first channel is determined to be a reference receiving channel, packet processing of another channel may be performed based on a packet receiving time of the first channel.

By maintaining a clock of a transceiver on a channel basis as one reference through such a packet processing apparatus and method, a relative time difference of packets using at least one physical channel can be accurately determined and relative time difference analysis is available.

Hereinafter, an apparatus and method for processing a packet according to another exemplary embodiment of the present invention will be described.

Figure 3:
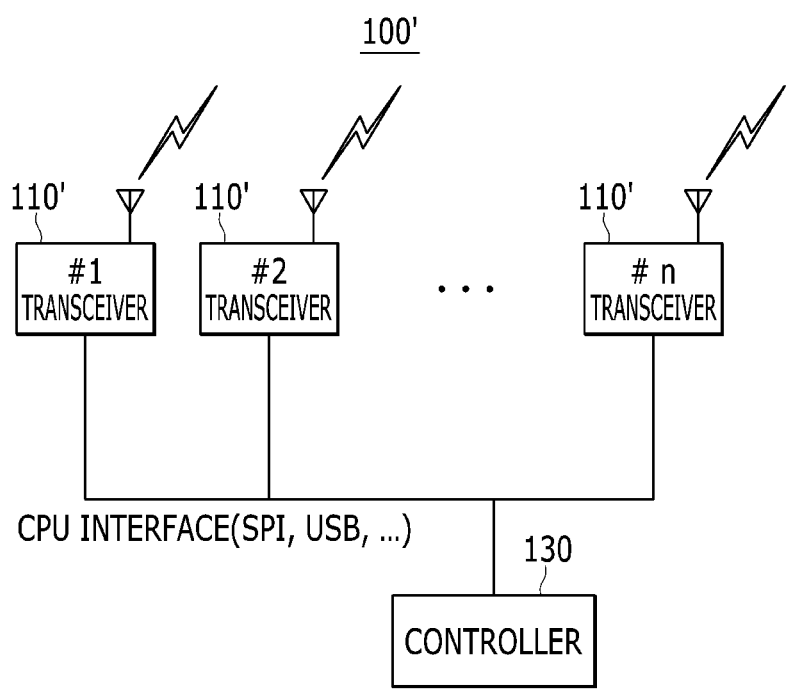
FIG. 3 is a diagram illustrating a structure of a packet processing apparatus in a multi-channel wireless network according to a second exemplary embodiment of the present invention.

FIG. 3 is a diagram illustrating a structure of a packet processing apparatus in a multi-channel wireless network according to a second exemplary embodiment of the present invention.

As shown in FIG. 3, a packet processing apparatus 100' according to a second exemplary embodiment of the present invention includes a plurality of transceivers 110' for transmitting/receiving a packet that is transmitted/received on a plurality of channels bases and a controller 130. Here, for convenience of description, the same reference numerals are given to constituent elements that perform the same functions as in the first exemplary embodiment. The packet processing apparatus 100' that is formed in such a structure is positioned within a region in which at least one wireless network service is provided, and receives and analyzes a packet within a receiving range.

In the second exemplary embodiment of the present invention, the transceiver 110' records a time at which a packet is received, determines received channel information, and notifies the controller 130 of the received channel information, and the controller 130 reads the packet that is received from the transceiver 110'.

The transceiver 110' includes a clock generator, and when a packet is received from a physical layer, the transceiver 110' records a packet receiving time and notifies the controller 130 that the packet has been received. Here, the clock generator may be controlled by an external input so that the clock generator itself may operate or synchronize with another clock generator. The transceiver 110' may generate a signal notifying reception of a packet, for example, at a time point at which a preamble of a packet is terminated, similar to the first exemplary embodiment.

The controller 130 determines time information at which a packet is received from a corresponding transceiver according to notification from the transceiver 110' and reads the determined packet.

According to the second exemplary embodiment of the present invention, each transceiver uses an independent clock generator, and in this case, a time of all transceivers may not correspond according to an error of a clock generator that is used in each transceiver. In an exemplary embodiment of the present invention, in order to provide a clock generator satisfying an error within an allowed range to all transceivers in consideration of this, a clock generating synchronization process is performed. For this purpose, a packet processing apparatus according to a second exemplary embodiment of the present invention may further include a clock synchronization unit.

Figure 4:
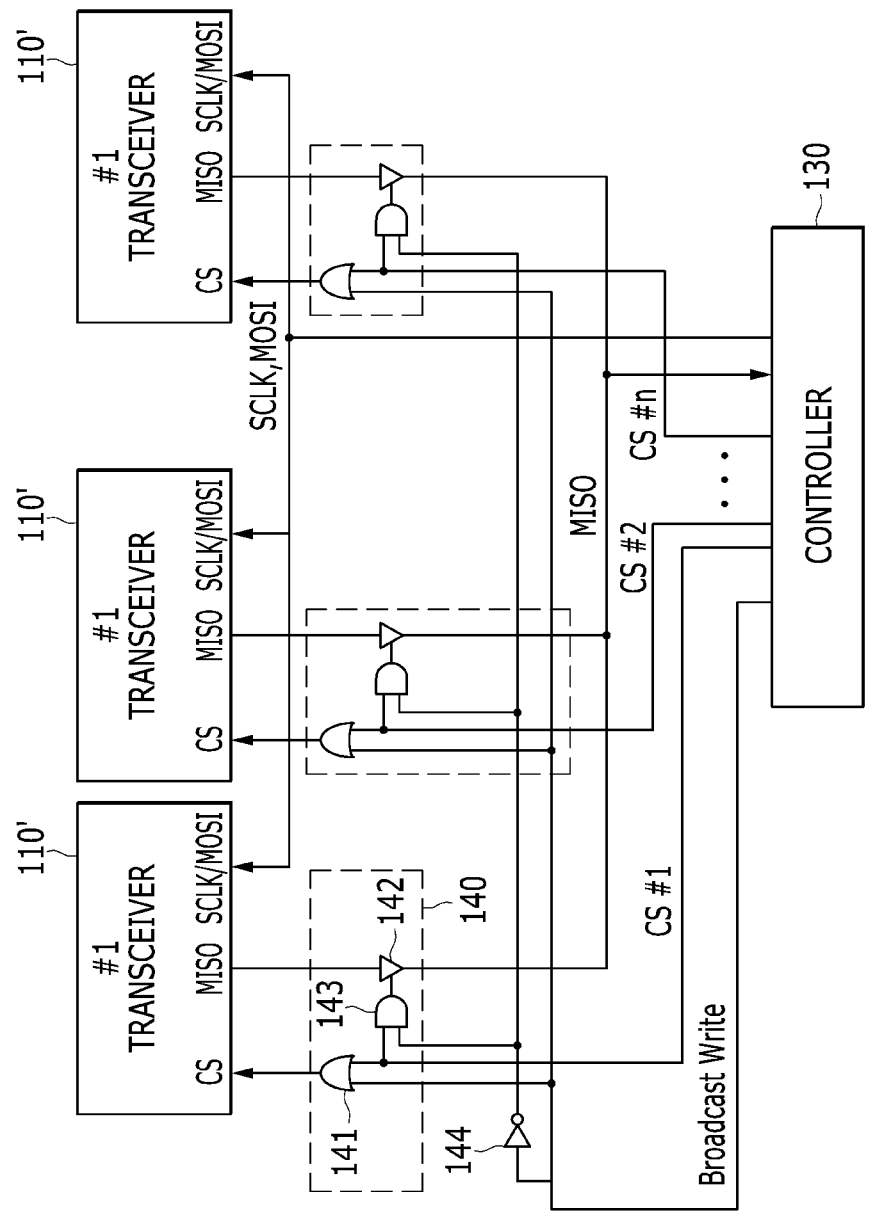
FIG. 4 is a diagram illustrating a structure of a clock synchronization unit for clock synchronization generation in a packet processing apparatus according to a second exemplary embodiment of the present invention.

FIG. 4 is a diagram illustrating a structure of a clock synchronization unit for generating clock synchronization in a packet processing apparatus according to the second exemplary embodiment of the present invention.

In a packet processing apparatus according to the second exemplary embodiment of the present invention, the clock generator of all transceivers 110' maintain an error within an allowed range.

When using only an absolute time instead of using an external source, the controller 130 generates time information, and all transceivers may be synchronized with such time information. When using an external synchronization source, after synchronizing the controller 130 with time information of a random transceiver that is synchronized with the synchronization source, all transceivers may be synchronized with the controller 130, similar to a case of not using an external synchronization source.

In this way, in order to synchronize time information of the controller 130 and at least one transceiver, each transceiver should perform a synchronization procedure with the controller 130. However, when each transceiver performs a synchronization procedure with the controller 130, a processing process becomes complicated, and each transceiver is synchronized with the controller 130 at different time points and thus an error may occur.

Therefore, in an exemplary embodiment of the present invention, in order to correspond time information of all transceivers at the same moment, all transceivers perform an operation of simultaneously writing time information in at least one control memory area and thus remove an error occurrence cause between transceivers due to a difference of a synchronization time point.

Specifically, in order for all transceivers according to an exemplary embodiment of the present invention to perform the same command at the same time point, a broadcast writing method in which all transceivers simultaneously write the same value at the same position to a control signal is performed.

For this purpose, while generating and outputting broadcast writing, the controller 130 activates and outputs chip selection signals cs#1, cs#2, . . . , and cs#n so as to perform time information writing of all transceivers.

A clock synchronization unit 140 operates according to broadcast writing and a chip selection signal that are output from the controller 130, and is positioned between each transceiver and the controller 130, as shown in FIG. 4. That is, the clock synchronization unit 140 is positioned to correspond to each transceiver.

When one of two signals is activated by operating broadcast writing and a chip selection signal, the clock synchronization unit 140 includes a first operator 141 that outputs a final write signal, which is a synchronization signal, to a corresponding transceiver. When a final write signal is activated (e.g., "1") and input, a corresponding transceiver performs a write operation that records time information. In this case, when all chip selection signals that are output from the controller 130 to each transceiver are activated, broadcast writing that simultaneously records time information that is provided from a clock generator that all transceivers have is performed.

Because a collision may occur between data that are input from each transceiver to the controller 130, the clock synchronization unit 140 according to an exemplary embodiment of the present invention includes a buffer 142 that stores data that is output from the transceiver 110, and further includes a second operator 143 and an inverter 150 that control output of the buffer 142.

The inverter 150 inverts and outputs broadcast writing from the controller 130, and the second operator 143 operates an output signal of the inverter 150 and a chip selection signal that is output from the controller 130 and outputs a corresponding buffer output signal to the buffer 142.

When broadcast writing is not activated and a chip selection signal is activated (e.g., broadcast writing "0" and a chip selection signal "1"), the second operator 143 of the clock synchronization unit 140 outputs an activated buffer output signal to the buffer 142 and enables data that is stored at the buffer 142 to be output to the controller 130. Accordingly, when a chip selection signal corresponding to each transceiver is activated, data that is output from a corresponding transceiver is input to the controller 130 through the buffer, and thus a collision between data that is output from the transceivers and that is input to the controller 130 is prevented. FIG. 4 illustrates a case of using a serial peripheral interface (SPI), but even when using a universal parallel bus, a clock synchronization unit of the above structure may be equally applied.

The controller 130 may prevent a collision of packets that are output from each transceiver and that are input to the controller 130 using a MOSI signal. When using a transmitting/receiving combined use bus, the controller 130 controls a bus using a MOSI control signal to prevent a collision of packets that are input to the controller 130.

Figure 5:
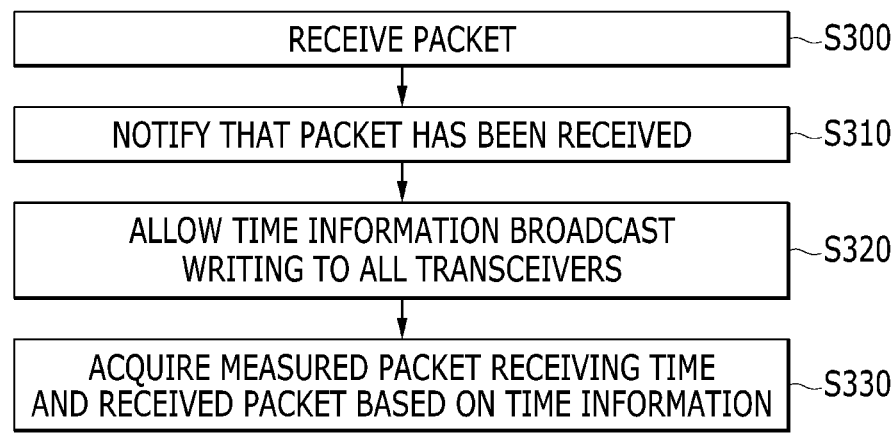
FIG. 5 is a flowchart illustrating a method of processing a packet according to a second exemplary embodiment of the present invention.

FIG. 5 is a flowchart illustrating a method of processing a packet according to the second exemplary embodiment of the present invention.

As shown in FIG. 5, reference time information that is commonly applied to all multi-channels is acquired, and by applying such reference time information to each channel, a packet receiving time is measured. In order to acquire reference time information, all transceivers perform a time information broadcast writing operation.

When a packet is transmitted/received through a plurality of multi-channels, if the packet is received through a random channel (S300), a transceiver of a corresponding channel notifies the controller 130 that the packet has been received (S310).

Accordingly, in order to correspond time information of all transceivers at the same moment, the controller 130 activates and outputs broadcast writing or a chip selection signal for operating each transceiver, and instructs to perform broadcast writing in which all transceivers simultaneously write the same value at the same position (S320). Therefore, a final write signal, which is a synchronization signal that is output from the clock synchronization unit 140 corresponding to each transceiver, is activated, all transceivers perform an operation that simultaneously writes time information in at least one control memory area. That is, as all transceivers record time information at the same position at the same moment, the transceivers are synchronized. The transceivers may measure a packet receiving time based on synchronized time information that is recorded by such broadcast writing. Therefore, error occurrence due to a difference of a synchronization time point between the transceivers is removed.

Thereafter, the controller 130 receives a received packet by sequentially operating each transceiver, and particularly, the controller 130 receives time information at which the measured packet is received based on time information that is performed by broadcast writing of the transceivers (S330). When the packet is received, the broadcast writing operation is performed, but the present invention is not limited thereto.

Further, in the foregoing exemplary embodiment, a method of processing a packet based on a transceiver has been described, but even in a case in which a transmitter and a receiver are individually embodied, the above method of processing a packet may be equally applied. That is, by synchronizing clocks of a transmitter and a receiver, as describe above, packet transmission and reception by a multi-channel wireless network can be performed.

According to an exemplary embodiment of the present invention, in a wireless sensor network and a wireless packet network such as a wireless local area network (WLAN) system, when transmitting/receiving a packet through at least two multi-channels using a time division multiple media access control method, a packet that is synchronized with each channel can be transmitted/received.

Further, effective channel analysis is performed based on a relative time difference between channels and thus an operation state of each channel can be determined. Further, a packet can be effectively transmitted/received using a relative time difference.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded, and can be easily embodied by a person of ordinary skill in the art from the description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A packet processing apparatus in a multi-channel wireless network, comprising:
   transceivers, each configured to receive or transmit a packet on a channel of the multi-channel wireless network;
   a reference clock management unit connected to each of the transceivers, configured to provide reference time information commonly applied to all channels of the multi-channel wireless network, configured to determine a packet receiving time when the packet is received by a transceiver, based on the reference time information according to an interruption signal provided from the transceiver, and configured to notify a controller that the transceiver received the packet,
   wherein the controller is configured to acquire the packet receiving time based on the reference time information received from the reference clock management unit.

2. The packet processing apparatus of claim 1, wherein the controller is configured to acquire the packet receiving time and channel information of the transceiver that receives the packet from the reference clock management unit according to notification of the reference clock management unit, and is configured to receive the packet from a transceiver based on the channel information.

3. The packet processing apparatus of claim 1, wherein the transceiver is configured to generate the interruption signal at a point in time at which a preamble of the received packet is terminated, and is configured to provide the interruption signal to the reference clock management unit.

4. A packet processing apparatus in a multi-channel wireless network, the packet processing apparatus comprising:
   transceivers, each configured to receive or transmit a packet on a channel of the multi-channel wireless network;
   clock synchronization units, configured to simultaneously generate and output a synchronization signal to the transceivers when a broadcast writing is activated or a chip selection signal is activated, and configured to enable the transceivers to acquire reference time information, wherein the clock synchronization unit comprises a first operator configured to activate the synchronization signal; and a controller, configured to acquire a packet receiving time of a received packet, based on the reference time information acquired based on the synchronization signal.

5. The packet processing apparatus of claim 4, wherein the clock synchronization units output the synchronization signal to a transceiver by operating according to a broadcast writing provided to the controller.

6. The packet processing apparatus of claim 4, wherein the transceivers comprise a clock generator, and the transceivers record time information based on a clock signal simultaneously output from a clock generator according to a synchronization signal, and the time information is used as reference time information.

7. The packet processing apparatus of claim 6, wherein the transceivers determine the packet receiving time at which the packet is received, based on the recorded time information, and provide the packet receiving time to the controller.

8. A method of processing a packet in a multi-channel wireless network, the method comprising:

acquiring, in a controller, reference time information from a reference clock management unit, wherein the reference time information is commonly applied to all channels of the multi-channel wireless network;

acquiring, in the controller, packet receiving time information of each packet received on a channel, based on the reference time information, wherein the acquiring of packet receiving time information comprises:

generating an interruption signal, when the packet is received through a physical layer in a channel, and determining the packet receiving time on a channel, based on reference time information commonly applied on all channels of the multi-channel wireless network that is provided from the reference clock management unit according to the interruption signal; and acquiring and analyzing, in the controller, a relative time difference between received packets, based on the packet receiving times of the received packets.

9. The method of claim 8, wherein the acquiring of reference time information comprises acquiring reference time information from a reference clock management unit connected to all channels of the multi-channel wireless network, and wherein the acquiring of packet receiving time information comprises determining the packet receiving time of a channel based on reference time information provided from the reference clock management unit.

10. The method of claim 8, wherein the interruption signal occurs at a point in time at which a preamble of the received packet is terminated.

11. The method of claim 8, wherein the acquiring of reference time information comprises enabling each transceiver to record time information at the same position, by simultaneously operating transceivers corresponding to each channel, and by using the recorded time information as commonly recorded reference time information.

12. The method of claim 11, wherein the acquiring of packet receiving time information comprises determining, by each transceiver, a time at which the packet is received, based on the recorded time information.

* * * * *